A. L. HIGH.
Photographic Picture-Exhibitor.
No. 161,120. Patented March 23, 1875.
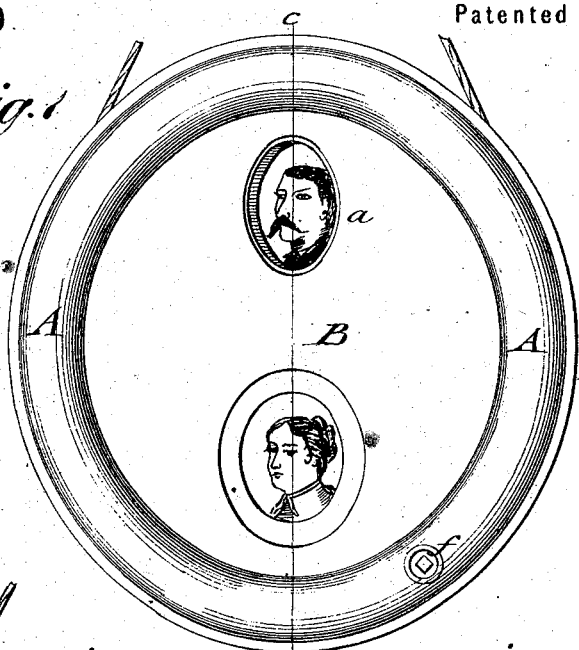
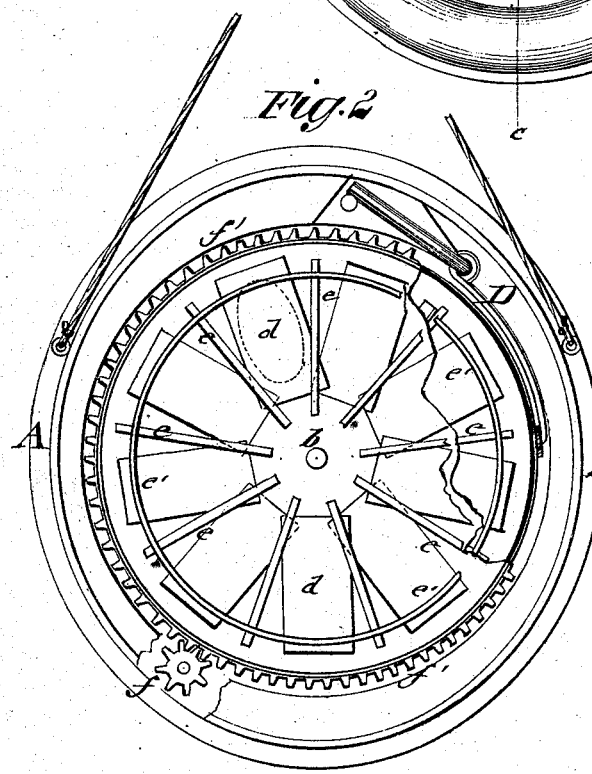
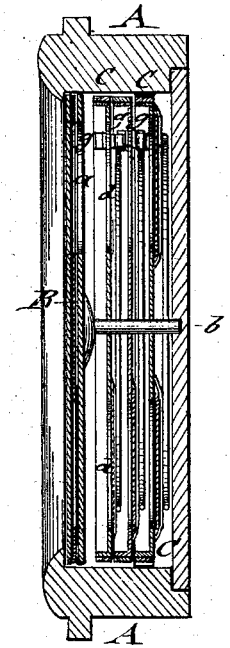

UNITED STATES PATENT OFFICE.

A. LUQUINCE HIGH, OF MOUNT HOLLY, NEW JERSEY.

IMPROVEMENT IN PHOTOGRAPHIC PICTURE-EXHIBITORS.

Specification forming part of Letters Patent No. 161,120, dated March 23, 1875; application filed January 30, 1875.

*To all whom it may concern:*

Be it known that I, A. LUQUINCE HIGH, of Mount Holly, Burlington county, New Jersey, have invented a new and Improved Frame for Exhibiting Photographs, of which the following is a specification:

Figure 1 represents a front view. Fig. 2 is a rear view, with cover detached; and Fig. 3 is a vertical transverse section on the line *c c*, Fig. 1, of my improved frame for the exhibition of photographic pictures.

Similar letters of reference indicate corresponding parts.

My invention relates to a picture-frame with interior revolving parts, arranged for the exhibition of photographs in such a manner that any number of them may be safely and conveniently placed in the same, and consecutively exhibited by the turning of the revolving parts.

The invention consists of an outer inclosing frame, with a glass-covered face-plate provided with one or more apertures and a central pivot or spindle on which one or more revolving picture-supporting frames or wheels turn. The revolving frames have suitable apertures and slides for inserting the photographs, and are set in motion by means of a circumferential cog-wheel of the last frame, in connection with a pinion turned by a crank or key. The revolving frames are turned one after the other by lugs engaging the adjoining pictures, and suitable spring-brakes.

In the drawing, A represents a picture-frame of any suitable shape or finish, which is provided back of the covering glass with a stationary plate, B, of sheet metal or other material. Plate B has one or more round or oval apertures, *a*, for exposing the revolving pictures below, and may be so arranged that the main part is taken up by a stationary picture above or below aperture *a*, as in Fig. 1. A central pivot, *b*, is secured to the rear of the plate B, and carries the revolving frames or disks C, which are provided in a circle around the pivot with a series of apertures, *d*, that correspond in shape and distance from the center with the front aperture *a*, so as to expose the picture applied to them through the front opening. The photographs are attached to the back of frame C by being slipped under suitable radial holding-strips *e*, and lateral supporting-wires *e'* or equivalent devices.

If more than one revolving frame C is used, one of the apertures *d* in each has to remain open for exhibiting the pictures of the frame back of the same. The hindmost frame C is revolved by means of a pinion, *f*, which is pivoted into a recess of frame A, and gears with cogs *f'* at the circumference of the frame, the pinion being turned to either side, as desired, by a crank or key. A projecting lug, *g*, of the rear revolving frame *c*, engages a similar rear lug, *g*, of the next adjoining frame, and causes the turning of the same after the revolution of the first is completed, and so on until all the photographs of each frame are exhibited.

Previous to starting the frames, their uncovered or open ovals have to be brought into line with the front aperture, so that the pictures of the frames, as they pass the apertures are exhibited in regular order.

For preventing the front frames from following the revolving motion of the rear frame, spring-brakes D are arranged in a recess of frame A, and adjusted so as to bear against the leather or other frictional circumference of each frame, retaining them until the friction of the brakes is overcome, and the pinions are set in motion by being engaged by the connecting-lugs.

A large number of photographs may thus be stored in one common frame, and protected and exhibited in a very neat and convenient manner.

Having thus described my invention, I claim as new and desire to secure by Letters Patent—

1. The picture-holding frames, revolving on a central pivot of the face-plate, in combination with intermediate connecting-lugs, and a circumferential cog-wheel and pinion gearing therewith, substantially as described.

2. The revolving picture-holding frames, in combination with separate spring-brakes applied to their circumference, for preventing the turning of the frames until released by the direct action of the operating pinion on the frame gearing therewith, substantially as specified.

A. LUQUINCE HIGH.

Witnesses:
GEORGE STEARNS,
JAMES M. SMITH.